United States Patent Office  3,091,443
Patented May 28, 1963

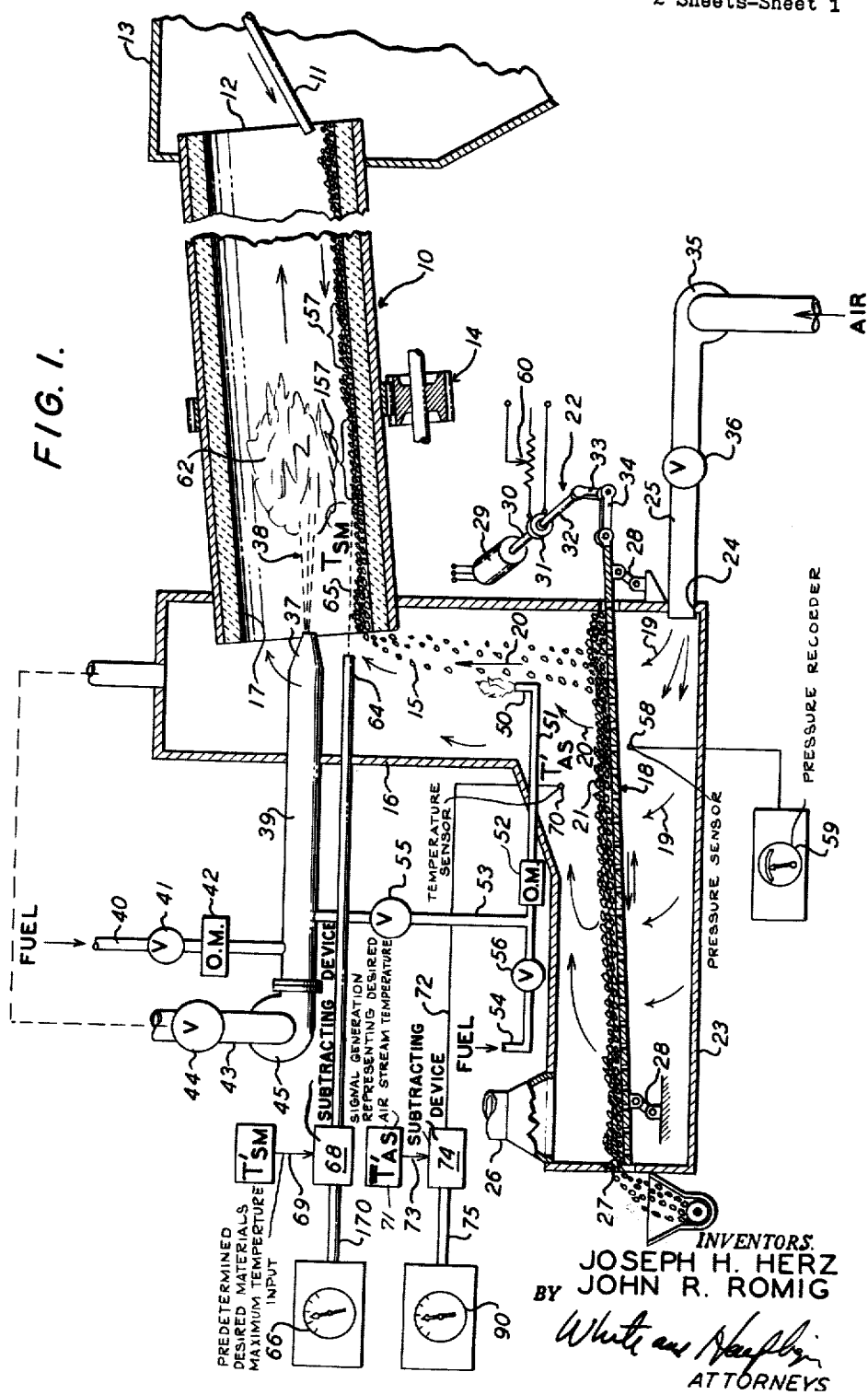

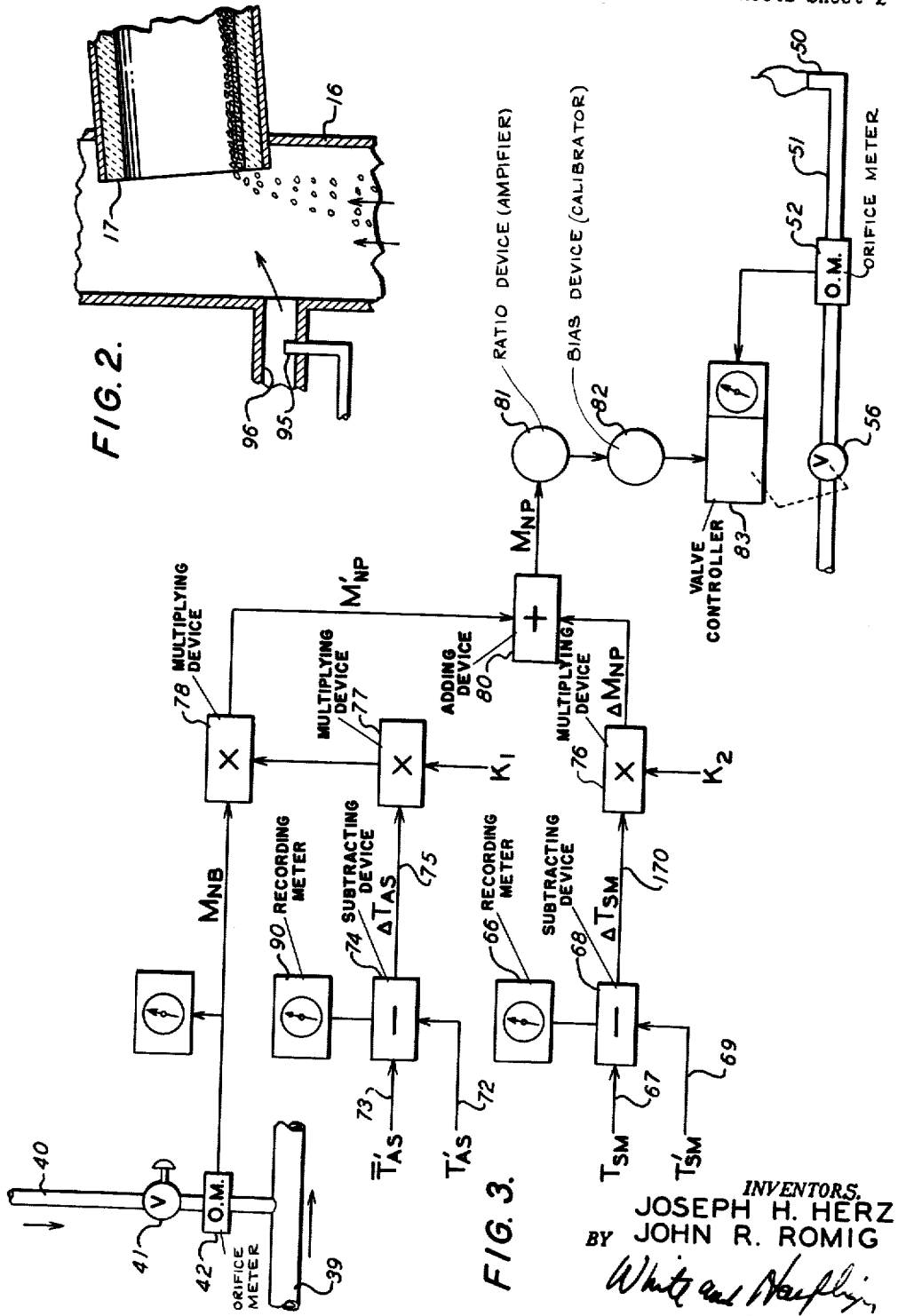

---

3,091,443
KILN AUTOMATIC CONTROL METHOD AND APPARATUS
Joseph H. Herz, Redlands, and John R. Romig, Rialto, Calif., assignors to California Portland Cement Co., Los Angeles, Calif., a corporation of California
Filed Apr. 17, 1961, Ser. No. 115,058
23 Claims. (Cl. 263—32)

This invention relates generally to improvements in the kiln treatment of calcareous materials, and more particularly concerns process and apparatus for increasing the efficiency of kiln operation.

In our copending application entitled "Kiln Control Method and Apparatus," Serial No. 95,697, filed March 14, 1961, we have described the control of fuel combustion within a kiln, as by controlled pre-heating of intake air, all for the purpose of favorably modifying or eliminating adverse effects upon kiln operation which might otherwise result from uncontrolled variable preheating of the air supply, or from perturbations in the flow of material being treated in the kiln, or from both of these variables. One advantageous method of controlling such combustion as described in said application is to add variable amounts of heat to the intake air previously preheated by passage in heat transfer relation with the clinker discharge from the kiln.

As will be seen, the present invention in its several aspects goes beyond that which was described in our prior application. In one broad respect, the improved method contemplates the steps that include secondarily preheating intake air that has been primarily preheated as by the hot clinker, and adjusting such secondary heating to compensate for fluctuations in the preheat temperature of the air stream, as sensed before and after secondary preheating, and for fluctuations in the materials temperature within a selected region of the kiln wherein the materials have near maximum temperature, thereby to achieve less variable heat treatment of materials in the kiln through controlling the location of fuel combustion with preheated air in the kiln.

More specifically, secondary preheating is typically adjusted by varying the amount of pilot fuel burned to secondarily preheat the intake air, the adjustment being made in accordance with the sum of two pilot fuel correction values. The first of these correction values corresponds, or is proportionally related, to the amount of fuel being delivered at the main burner for burning in the kiln, and also to the difference between the primarily preheated intake air stream temperatures sensed before secondary preheating and a fixed or desired secondary preheat temperature. The second of these correction values corresponds, or is proportionally related, to the difference between the maximum temperature of the materials within the kiln and a predetermined desired materials maximum temperature.

In its apparatus aspects, the invention contemplates the provision of means, including temperature and fuel flow rate sensors, for obtaining these first and second correction values and then for using them to control the rate of pilot fuel delivery, as will be described.

These and other objects and advantages of the invention, as well as the details of an illustrative embodiment, will be more fully understood from the following detailed description of the drawings, in which:

FIG. 1 is a vertical section through a kiln system showing the apparatus by which the improvements may be effected;

FIG. 2 is a fragmentary elevation showing a modification of the apparatus; and

FIG. 3 is a flow diagram showing the manner in which pilot fuel correction values are obtained and combined for controlling the rate of flow of pilot fuel used to secondarily preheat the intake air.

Referring first to FIG. 1, a rotary kiln is generally indicated at 10 as having elongated tubular shape and as being inclined from the horizontal. Raw materials are fed at 11 into the upstream open end 12 of the kiln which projects into a housing 13. The raw materials, which typically contain $SiO_2$, $Al_2O_3$, $Fe_2O_3$, $CaCo_3$, $MgCo_3$, $Na_2O$ and $K_2O$ in correct proportions to produce Portland Cement, travel lengthwise downstream through the kiln, principally in response to rotation thereof, which may be effected by any suitable means such as is generally indicated at 14. Furthermore, the kiln rotary speed may be controlled as desired, and in the past it has been generally the practice to attempt to control materials flow within the kiln by changing the speed of kiln rotation.

After passing downstream through the kiln, the materials discharge as clinker shown dropping at 15 within hood 16 into which the open downstream end 17 of the kiln projects. The clinker falls downwardly upon a grate means 18, where the clinker is retained in heat transfer relation with intake air streams moving upwardly as indicated at 19 and 20 and through the clinker bed 21. It will be understood that the clinker bed slowly travels along the length of the grate 18, which may be moved as by means of the drive generally shown at 22. The grate 18 and clinker bed 21 are confined within a clinker cooler housing 23 having an entrance at 24 for air delivered through duct 25, a stack 26 remote from the hood 16, and a clinker discharge outlet 27. Merely for purposes of illustration, the grate 18 is shown as supported on pivoted links 28 accommodating arcuate movement of the grate in response to operation of the drive means 22. The latter may include a motor 29 having a shaft 30, a coupling 31, another shaft 32 for driving the crank 33, and a link 34 connected between the crank and the grate. Also, the air duct 25 is shown as supplied with air by a suitable blower 35 through a damper 36.

In operation, air delivered through the duct 25 passes upwardly through the clinker bed 21 for the purpose of preheating the air and cooling the clinker, following which the air flows upwardly through the hood 16 and into the downstream end of the kiln. Fuel is delivered to the downstream end of the kiln through a nozzle 37, the fuel becoming ignited for combustion with the air oxygen at a point 38. The fuel which may comprise natural gas, oil, powdered coal, or any suitable flowable combustible, is typically supplied to the nozzle 37 through a conduit 39. If natural gas is used, it may be supplied through an auxiliary line 40 into which a valve 41 and orifice meter 42 are connected. If oil or powdered coke or coal are used, they may be supplied to line 39 through suitable inlets, and primary air may be delivered to the conduit 39 through a line 43 into which a valve 44 is connected, a suitable blower 45 being shown for delivering primary air at desired pressure and volume to the conduit 39.

Means for secondarily preheating the intake air, which may take different forms, is shown in one of its forms at 50 in the throat region of the clinker cooler so as to be directly in the path of the preheated air stream flowing to the downstream end of the kiln. While the heater may take different forms, it is shown in FIG. 1 merely for purposes of illustration as a gas burner to which gas is supplied through a line 51 in which an orifice meter 52 is connected for metering measurement purposes. As shown, line 51 may be supplied by either of lines 53 and 54, line 53 delivering a side stream of gas from the main conduit 39 and through a control valve 55, and line 54 delivering an independent side stream of gas through a control valve 56, the latter being preferred.

The purpose of the heater 50 is to controllably and additionally heat the incoming or secondary air prior to combustion of the main fuel stream in the kiln, thereby to control or adjust the combustion within the kiln to vary the regional location lengthwise of the kiln at which the hot gas reaches temperatures in excess of the materials maximum temperature. As a result, the temperature and the movement of the materials in the kiln may be controlled, and particularly that movement of materials associated with fluidization thereof in the critical zone generally shown at 57 in FIG. 1.

In accordance with the invention, it is contemplated that equilibrium conditions may be produced and maintained to best advantage, and with least deviation from optimum, by maintaining the speed of kiln rotation substantially constant during the adjustment of flaming combustion, by maintaining the flowage of the main stream of fuel into the kiln substantially constant while the flowage of the side stream of fuel through line 51 is increased or decreased as required, by maintaining the same flow rate of raw materials into the kiln at 11, and by maintaining essentially the same volumetric flow of air into the clinker cooler through the conduit 25, for preheating and ultimate flow to the kiln. Such primary preheating of the air by the clinker is such as to raise the temperature of the air above 1000° F. prior to the increased or decreased secondary preheating effect accomplished by operation of the auxiliary burner 50. Furthermore, under equilibrium conditions it is desirable that the primary preheating of the air by the clinker be stabilized as respects the temperature of the air flowing upwardly from the clinker bed, whereby the auxiliary or secondary heater 50 may be operated in part as a fine temperature control to smooth out any fluctuations in air temperature.

For purposes of achieving primary stabilization of the air preheat temperature, the movement of grate 18 may be varied in response to pressure changes of secondary air, as for example as shown in FIG. 1. Thus, a pressure sensing device 58 may be located beneath the grate 18 and the pressure conditions may be viewed on a meter or instrument 59. Also, the speed of grate movement may be controlled by a magnetic clutch 31 in the drive 22, or an equivalent device, the energization of the clutch being controlled electrically as by the rheostat 60. Accordingly, the operator may control the rheostat and thus the drive to decrease or increase the speed of grate movement in response to a decrease or increase respectively in the secondary air pressure, as measured before the air passes through the clinker received on the grate. In this connection, it will be understood that a stable preheat temperature of the air passing through the clinker bed is associated with a stable thickness. If for any reason there should occur an increased discharge of clinker from the kiln, this change will result in a changed pressure as measured by the device 58 so that the operator may then adjust the grate drive in such manner as to adjust the bed thickness to reestablish the desired pressure, to which the desired stabilized preheat temperatures are related.

It will be understood that local changes in the downstream movement of materials in the kiln in response to fluidization within the critical zone shown at 57 in FIG. 1, tend to disturb the heat transfer conditions within the kiln in such manner as to amplify the tendency for materials to so move. For example, an observed increase in the rate of movement of materials through the fluidization zone and toward the downstream end of the kiln results in the lowering of the total heat level in the exothermic area 157, which thereby causes a later fuel ignition, i.e. a shifting of the ignition point 38 further from the downstream end 17 of the kiln. This in turn results in the physical lengthening of the tip of the flame 62, and the heat level in the fluidization zone 57 of the kiln is increased, which tends to produce a further increase in the rate of flow of materials from and through the fluidization zone. If these chain reactions are not suitably dealt with, there results what is commonly known as the "loss of the kiln."

In accordance with the invention, the combustion of the fuel with the incoming air is adjusted to vary the heat transfer in the kiln in such manner as to counter the amplified tendency for materials to move at faster or slower rates through the critical zone, and specifically, the combustion is adjusted to effect a downstream or upstream displacement of the ignition point 38. This adjustment also effects a downstream or upstream displacement of the regional location lengthwise of the kiln at which the hot gas reaches temperatures in excess of the materials maximum temperature $T_{SM}$.

More specifically, the combustion is adjusted by effecting an increase or decrease in the temperature of air passing into the kiln, as by controlling the amount of fuel passing to line 51 and delivered to the auxiliary burner 50. To accomplish this, the means for effecting a displacement of the combustion ignition point typically includes temperature sensing apparatus for sensing changes in the nature of fluctuations or excursions, in the downstream materials temperature conditions in the kiln causatively related to the amplified tendency for materials to move within the zone 57. Such temperature sensing apparatus may include a temperature sensing device 64, as for example a pyrometer, or Rayotube, or light pipe directed to receive rays 65 emanating from area 157 at or near the maximum solids temperature $T_{SM}$.

The variable signal from the sensor 64 is conducted by line 67 to a device 68 also having a constant signal input at 69 representing a predetermined desired maximum materials temperature $T'_{SM}$. The output 170 of the device 68 represents the difference between the two inputs, or $\Delta T_{SM}$ which is indicated on a suitable meter 66. Thus, the device 68 functions to compare or algebraically add the two inputs, and it may take many different physical forms, depending on the mechanical, hydraulic, pneumatic, electrical, or optical nature of the inputs and output desired. For example, in the case of electrical inputs, the device may comprise a Wheatstone bridge or a potentiometer; and in the case of pneumatic or gas pressure inputs varying with temperature, the device 68 may comprise a pair of Bourdon gauges, one for each input, and interconnected in opposition.

The means for effecting a displacement of the combustion ignition point also includes temperature sensor 70 located in the intake air stream to measure changes, in the nature of fluctuations or excursions, in the temperature $T'_{AS}$. The latter represents the temperature of the air after it has been primarily preheated as by the clinker bed, but before secondary preheating as by combustion of pilot fuel at 50. A temperature $\overline{T}'_{AS}$ on the other hand is the desired temperature of the air stream after secondary preheating, when $\Delta T_{SM}$ is equal to zero. An adjustable signal generator is shown at 71 for generating a signal representing $\overline{T}'_{AS}$.

The variable signal from the sensor 70, and the fixed signal from manual input 71 are conducted by input lines 72 and 73 to a device 74 having an output at 75 representing the difference between the two inputs, or $\Delta T_{AS}$ which is indicated on a suitable meter. Thus, the device 74 functions to compare or algebraically add the two inputs, and it may take many different physical forms depending on the mechanical, hydraulic, pneumatic, electric, or optical nature of the inputs and outputs desired, in the same manner as discussed above in connection with device 68.

Referring to FIG. 3, the correction to be applied to the pilot fuel valve 56 may be represented by the symbol $M_{NP}$ which is the sum of first and second correction values $M'_{NP}$ and $\Delta M_{NP}$ respectively. The first correction value $M'_{NP}$ may be considered as compensating for variations or fluctuations in the temperature difference $\Delta T_{AS}$ according to the equation:

$$M'_{NP} = K_1 \times \Delta T_{AS} \times M_{NB} \quad (1)$$

where $M'_{NP}$=pound mols/second of fuel to be used for $T'_{AS}$ correction.

$K_1$=experimentally determined constant for any particular kiln process $\Delta T_{AS}$=difference between a predetermined desired temperature of the air stream, and the primarily preheated air stream temperatures as sensed ($\Delta T_{AS} = T'_{AS} - T'_{AS}$ in ° R or ° F.)

$M_{NB}$=pound mols/second of fuel being delivered at the main burner for burning in the kiln Accordingly, if the fuel delivery to the main burner $M_{NB}$ remains constant, then $M'_{NP}$ varies directly as $\Delta T_{AS}$.

The second correction value $\Delta M_{NP}$ may be considered as compensating for variations or perturbations in the temperature difference $\Delta T_{SM}$ according to the equation:

$$\Delta M_{NP} = K_2 \times \Delta T_{SM} \quad (2)$$

where $M_{NP}$=pound mols/second of fuel to be added or subtracted for $T_{SM}$ correction.

$K_2$=experimentally determined constant for any particular kiln process $\Delta T_{SM}$=difference between a predetermined desired materials maximum temperature, and the maximum temperature of the materials within the kiln as sensed ($\Delta T_{SM} = T'_{SM} - T_{SM}$ in ° R or ° F.)

The constants $K_1$ and $K_2$ in the above two equations may be obtained experimentally by operating any given kiln by trial and error to achieve equilibrium, and noting the correspondence between the value $M_{NP}$ or the amount of correction fuel to the pilot burner needed to reestablish equilibrium of $T_{SM}$ and the values $\Delta T_{AS}$ and $\Delta T_{SM}$. Once these constants are determined with acceptable accuracy, they may be combined in multiplying relation with the other values on the right hand sides of Equations 1 and 2, as by suitable devices indicated at 76, 77 and 78 in FIG. 3, to obtain the pilot fuel correction values $\Delta M_{NP}$ and $M'_{NP}$. Analog computing devices of the type 76, 77 and 78 are well known, and they are shown in block form as indicative of any mechanical, hydraulic, pneumatic, electric or optical device of this type which will perform the desired multiplying functions. Device 76 multiplies inputs $K_2$ and $\Delta T_{SM}$ to produce output $\Delta M_{NP}$; and device 77 multiplies inputs $K_1$ and $\Delta T_{AS}$ to produce an output which is in turn multiplied by input $M_{NB}$ in device 78 to produce output $M'_{NP}$.

The two outputs $M'_{NP}$ and $\Delta M_{NP}$ are subsequently fed to device 80 which adds them and produces the correction value $M_{NP}$ which may be fed through ratio and bias devices 81 and 82 to a controller 83 for the valve 56. Such devices as 80 through 83 are well known, and are shown in block form as indicative of any mechanical, hydraulic, pneumatic, electrical, or optical devices which will perform the referred-to functions.

Conventional subtracting and adding instruments 68, 74 and 80, and multiplying instruments 76, 77 and 78 are described in technical information bulletins 39—163a and 39—164a published in 1960 by The Foxboro Company, Foxboro, Massachusetts. Ratio instrument 81 may be a potentiometer, and device 82 a signal amplifier. These elements are also disclosed in "Analog Method in Computations and Simulations" by Walter W. Soroka (published 1954), and "Analog Computation" by George W. Smith and Roger C. Wood (published 1959), both references being publications of the McGraw Hill Book Company.

Generally speaking, the maximum rate of pilot fuel combustion B.t.u. addition to the air outside the kiln to be used, is substantially less than 50% of the rate of main fuel combustion B.t.u. addition to the air. Thus, the temperature of air already heated by clinker outside the kiln need be increased or decreased typically but not necessarily by less than 200° F. to achieve desired combustion control in the kiln, wherein gas temperatures will exceed 3000° F. following main fuel combustion in the kiln.

Kiln operators may themselves become skilled in adjusting the pilot fuel valve 56 in response to observation of the meters 66 and 90, the former recording the temperature difference $\Delta T_{MS}$ and the latter recording the temperature difference $\Delta T_{AS}$ for the purpose of varying the pilot fuel to achieve less variable heat treatment of the materials in the kiln, and particularly in the region 57. For example, if both of the temperature differences $\Delta T_{SM}$ and $\Delta T_{AS}$ are increasing, the operator will open the valve 56 to admit more pilot fuel to burner 50, for effecting increased heating of the intake air.

Actual operation of a cement kiln according to these principles has been found to be entirely successful and to eliminate for all practical purposes conditions otherwise leading to the "loss of the kiln."

FIG. 2 shows an alternative placement of the pilot burner 95 within a duct 96 conveying a side stream of air into the hood 16 to mix with the main intake air stream flowing upwardly toward the downstream end of the kiln.

The more generalized correction values $M'_{NP}$ and $\Delta M_{NP}$ are defined according to the following equations, which hold for any kiln and cooler system using natural gas as fuel.

$$M'_{NP} = \frac{\overline{M}_{GO}(T'_{AS} - 560)\overline{M}_{GB}(T'_{AS} - 560)}{11.01 \left( T'_{AS} - 560 + \dfrac{54,900}{F_{AS}} \right)} \quad (3)$$

where $M'_{NP}$=pound mols/second of fuel to be used for $T'_{AS}$ correction.

$\overline{M}_{GO}$=average pound mols/second of fuel plus air delivered to kiln system, and comprising the sum $\overline{M}_{GP} + \overline{M}_{GB}$ $\overline{M}_{GP}$=average pound mols/second of pilot burner fuel flow plus equivalent air for its complete combustion $\overline{M}_{GB}$=average pound mols/second of main fuel flow plus equivalent air to the kiln $T'_{AS}$=average desired air temperature in degrees Rankine, when $\Delta T_{SM}$=zero $T'_{AS}$=average temperature in degrees Rankine of said primarily preheated air $F_{AS}$=fractional percent of total combustion air flow originating as said preheated air stream flow $$\Delta M_{NP} = \frac{0.001946 D^2 \Delta T_{SM}}{6283 + 0.1969 T_N + 1.9686 \left( F_{AS} T'_{AS} + F_{AH} T_{AH} \right)} \quad (4)$$

where $\Delta M_{NP}$=pound mols/second of fuel to be added to or subtracted for $T_{SM}$ correction $D$=kiln diameter, in feet, inside the coating of zone 157

$\Delta T_{SM}$=difference between a predetermined desired materials maximum temperature, and the maximum temperature of the materials within the kiln as sensed ($\Delta T_{SM} = T'_{SM} - T_{SM}$ in ° R or ° F.)

$T_N$=temperature in degrees Rankine of fuel supplied to kiln $F_{AS}$=fractional percent of total combination air flow originating as said preheated air stream flow $T'_{AS}$=average desired temperature in degrees Rankine of said primarily preheated stream if $\Delta T_{SM}$=zero $F_{AH}$=fractional percent of total combustion air flow originating from sources other than said preheated air stream flow $T_{AH}$=initial average temperature in degrees Rankine of combustion air originating from sources other than said preheated air stream flow Equation 1 is a simplified and specialized version of the generalized Equation 3, the derivation of the latter being predicated on the requirement of keeping the kiln inlet air stream constant at the pre-selected temperature $\bar{T}'_{AS}$. $M'_{NP}$ represents the necessary B.t.u. to accomplish this purpose. Controlling factors include: total gas plus equivalent air, ($\bar{M}_{GO}$); main burner gas plus equivalent air, ($\bar{M}_{GB}$); actual temperature of air from cooler before secondary heating, ($T'_{AS}$); fraction of total air coming from cooler, ($F_{AS}$); desired temperature of air from cooler after secondary heating by pilot, ($\bar{T}'_{AS}$); and the mol. ratio of natural gas plus theoretical air per mol. natural gas, which equals 11.01 for most natural gas. The factors 560 and 54,900 are constants or derivation adjusting for units of measurement.

In a typical computation involving use of Equation 3 to derive $K_1$ of Equation 1, the desired average pilot natural gas plus equivalent air flow ($\bar{M}_{GP}$) might be 1.5 percent of the total average natural gas plus equivalent air flow ($\bar{M}_{GO}$). Therefore, since $\bar{M}_{GO}=\bar{M}_{GP}+\bar{M}_{GB}$ it follows that $\bar{M}_{GB}=0.985\ \bar{M}_{GO}$, or $\bar{M}_{GO}=1.015\ \bar{M}_{GB}$. Also, the normal average $T'_{AS}$ equals 1860° Rankine (1400° F.), the desired average $\bar{T}'_{AS}$ equals 1960° Rankine (1500° F.) and the estimated $F_{AS}$ might be 0.95. Incorporation of these values in Equation 3 results in:

$$M'_{NP}=\frac{1.015\bar{M}_{GB}(\bar{T}'_{AS}-560)-\bar{M}_{GB}(T'_{AS}-560)}{11.01(1860-560)+\frac{54,900}{0.95}}$$

which reduces to:

$$M'_{NP}=\frac{\bar{M}_{GB}(1.015\bar{T}'_{AS}-T'_{AS}-569+560)}{14,313+57,789}$$

which for all practical purposes for the kiln used in the example can be written:

$$M'_{NP}=\frac{\bar{M}_{GB}(\bar{T}'_{AS}-T'_{AS})}{72,102}$$

The natural gas fuel being used requires 10.01 pound mols of air per pound mol of fuel, and thus $$\bar{M}_{GB}=(10.01+1)\ M_{NB}=11.01\ M_{NB}$$

Therefore, $$M'_{NP}=\frac{11.01M_{NB}(\bar{T}'_{AS}-T'_{AS})}{72,102}$$

or $$M'_{NP}=0.000153\times\Delta T_{AS}\times M_{NB}$$

which is equivalent to Equation 1 where $K_1=0.000153$. This manner of approximating the factor $K_1$ has been found sufficiently accurate to allow automatic kiln operation. Values for $K_1$ above and below this value derived from Equation 3 may be tried to determine the exact value of $K_1$ most suited to the kiln in question.

Equation 2 is a simplified and specialized version of the generalized Equation 4. The derivation of the latter is predicated on the requirement of maintaining the temperature of the combusting gas and air stream equal to the maximum solids temperature at the exact physical position in the kiln where the maximum solids temperature is achieved. $\Delta M_{NP}$ represents the necessary B.t.u. to accomplish this purpose. Controlling factors are: kiln diameter inside the burning zone coating (D); difference between desired and measured maximum solids temperatures, $\Delta T_{SM}$; temperature of the natural gas, $T_N$; temperature of the cooler air as it enters the kiln, $\bar{T}'_{AS}$; temperature of the ambient air as it enters the system, $T_{AH}$; fraction of total air coming from the cooler, ($F_{AS}$); and fraction of total air resulting from ambient hood leakage, ($F_{AH}$). The factors 0.0001946, 6283, 0.1969 and 1.9686 in Equation 4 are constants of derivation adjusting for units of measurement.

In a typical computation involving use of Equation 4 to derive $K_2$ of Equation 2, D might be 9 feet; $T_N$ might be 500° Rankine (40° F.); $F_{AS}$ might be 0.95 (estimated); $F_{AH}$ might be 0.05 (estimated); $T_{AH}$ might be 540° Rankine (80° F.); and $\bar{T}'_{AS}$ might be 1960 Rankine (1500° F.). Incorporation of these values in Equation 4 results in $$\Delta M_{NP}=\frac{0.001946(9)\ (9)\times\Delta T_{SM}}{6283+.1969(500)+1.9686[.95(1960)+.05(540)]}$$

which reduces to:

$$\Delta M_{NP}=0.0000156\times\Delta T_{SM}$$

The latter is equivalent to Equation 2 where $K_2$ is now equal to 0.0000156 for this special application. This manner of approximating the factor $K_2$ has been found sufficiently accurate to allow automatic kiln operation, and values for $K_2$ above and below the derived value may be tried to determine the exact value best suited for the kiln in question.

We claim:

1. In the process wherein materials flowing in a kiln are heated to high temperature necessary to production of a desired product, the steps that include flowing an air stream in combustion relation with main fuel to produce hot gas flowing in the kiln to heat the materials therein, effecting primary and secondary preheating of air forming said stream and prior to use of the air for main fuel combustion, whereby air temperature fluctuations result from said primary preheating, the materials within a predetermined region of the kiln having materials temperature fluctuations, said air and materials temperature fluctuations having an ultimately adverse effect upon the heating of said materials to said high temperature, said secondary preheating being effected by combustion of auxiliary fuel for heating air flowing to the kiln, obtaining correction values corresponding to said air and materials temperature fluctuations, and using said values to control said secondary preheating to counter said adverse effect on the heating of said materials to said high temperature.

2. In a cement making process wherein materials flowing downstream in a kiln are heated to high temperature necessary to the production of a desired quality clinker product, the steps that include flowing an air stream in combustion relation with main fuel to produce hot gas flowing upstream in the kiln to heat the materials therein, effecting primary and secondary preheating of air forming said stream and prior to use of the air for main fuel combustion, whereby air temperature excursions result from said primary preheating, the materials within a predetermined region of the kiln having materials temperature excursions, said air and materials temperature excursions having an ultimately adverse effect upon the heating of said materials to said high temperature whereby the clinker product deviates from desired quality, obtaining first correction values corresponding to excursions in the primary preheated air temperature, obtaining second correction values corresponding to excursions in the temperature of the materials in said predetermined region of the kiln, and using said first and second correction values for controlling said secondary preheating to counter said adverse effect on the heating of said materials to said high temperature.

3. The invention as defined in claim 2 in which said secondary preheating is effected by combustion of auxiliary fuel in the air stream flowing to the kiln.

4. The invention as defined in claim 3 in which the obtaining of said first correction values includes sensing the temperature of said primarily preheated air stream before secondary preheating thereof.

5. The invention as defined in claim 4 in which the obtaining of said second correction values includes sensing the actual temperature of the materials within said predetermined region of the kiln.

6. The invention as defined in claim 5 in which the obtaining of said second correction values includes comparing the materials temperature actually sensed and a predetermined desired materials temperature.

7. The invention as defined in claim 6 in which the obtaining of said primary correction values includes comparing primarily preheated air temperatures and a predetermined desired air temperature.

8. The invention as defined in claim 5 in which said materials within said predetermined region of the kiln have temperatures proximate the maximum materials temperature in the kiln.

9. The invention as defined in claim 2 in which said first correction value is effectively determined substantially in accordance with the equation:

$$M'_{NP} = K_1 \times \Delta T_{AS} \times M_{NB}$$

where $M'_{NP}$ = pound mols/second of fuel to be used for $T'_{AS}$ correction $K_1$ = experimentally determined constant for any particular kiln process $\Delta T_{AS}$ = difference between a predetermined desired temperature of the air stream, and the primarily preheated air stream temperatures as sensed ($\Delta T_{AS} = T'_{AS} - T'_{AS}$ in °R or °F.)

$M_{NB}$ = pound mols/second of fuel being delivered for burning in the kiln at the main burner 10. The invention as defined in claim 9 in which said second correction value is effectively determined substantially in accordance with the equation $$\Delta M_{NP} = K_2 \times \Delta T_{SM}$$

where $\Delta M_{NP}$ = pound mols/second of fuel to be added or subtracted for $T_{SM}$ correction $K_2$ = experimentally determined constant for any particular kiln process $\Delta T_{SM}$ = difference between a predetermined desired materials maximum temperature, and the maximum temperature of the materials within the kiln as sensed ($\Delta T_{SM} = T'_{SM} - T_{SM}$ in °R or °F.)

11. The invention as defined in claim 10 in which the use of said first and second correction values includes effectively adding them to derive a resultant correction value to be be used in controlling said adjustment of said secondary preheating.

12. The invention as defined in claim 2 in which said first correction value is effectively determined substantially in accordance with the equation:

$$M'_{NP} = \frac{M_{GO}(T'_{AS} - 560) - M_{GB}(T'_{AS} - 560)}{11.01(T'_{AS} - 560) + \frac{54,900}{F_{AS}}}$$

where $M'_{NP}$ = pound mols/second of fuel to be used for $T'_{AS}$ correction $M_{GO}$ = average pound mols/second of fuel plus air delivered to kiln system, and comprising the sum, $M_{GP} + M_{GB}$ $M_{GP}$ = average pound mols/second of pilot burner fuel flow plus equivalent air for its complete combustion $M_{GB}$ = average pound mols/second of main fuel flow plus equivalent air to the kiln $T'_{AS}$ = average desired temperature in degrees Rankine of said secondarily preheated air when $\Delta T_{SM}$ = zero $F_{AS}$ = fractional percent of total combustion air flow originating as said preheated air stream flow $T'_{AS}$ = average temperature in degrees Rankine of said primarily preheated air 13. The invention as defined in claim 12 in which said second correction value is effectively determined substantially in accordance with the equation:

$$\Delta M_{NP} = \frac{0.001946 D^2 T_{SM}}{6283 + 0.1969 T_N + 1.9686(F_{AS} T'_{AS} + F_{AH} T_{AH}}$$

where $\Delta M_{NP}$ = pound mols/second of fuel to be added to or subtracted for $T_{SM}$ correction $D$ = kiln diameter, in feet, inside the coating of zone 157

$\Delta T_{SM}$ = difference between a predetermined desired materials maximum temperature, and the maximum temperature of the materials within the kiln as sensed ($\Delta T_{SM} = T'_{SM} - T_{SM}$ in °R or °F.)

$T_N$ = temperature in degrees Rankine of fuel supplied to kiln $F_{AS}$ = fractional percent of total combination air flow originating as said preheated airstream flow $T'_{AS}$ = average desired temperature in degrees Rankine of said primarily preheated stream if $\Delta T_{SM}$ = zero $F_{AH}$ = fractional percent of total combustion air flow originating from sources other than said preheated air stream flow $T_{AH}$ = initial average temperature in degrees Rankine of combustion air originating from sources other than said preheated air stream flow 14. The invention as defined in claim 11 in which the use of said first and second correction values includes effectively adding them to derive a resultant correction value to be used in controling said adjustment of said secondary preheating.

15. In the process wherein materials are subjected to treatment with hot gas flowing upstream in a kiln, hot gas being produced upon burning of fuel in the kiln, and in a stream of air primarily preheated to variable preheat temperature outside the kiln, variation in said primary preheat temperature being characterized as ultimately adversely affecting said materials treatment, the steps that include secondarily preheating air in said stream prior to burning of said fuel therein, obtaining certain correction values corresponding to changes in the primary preheat temperature of said stream, and using said correction values to control adjustment of said secondary preheating to compensate for said changes so as to counter said adverse effect on materials treatment, said correction values being determined substantially in accordance with the equation:

$$M'_{NP} = K_1 \times \Delta T_{AS} \times M_{NB}$$

where $M'_{NP}$ = pound mols/second of fuel to be used for $T'_{AS}$ correction $K_1$ = experimentally determined constant for any particular kiln process $\Delta T_{AS}$ = difference between a predetermined desired temperature of the air stream, and the primarily preheated air stream temperatures as sensed ($\Delta T_{AS} = T'_{AS} - T'_{AS}$ in °R or °F.)

$M_{NB}$ = pound mols/second of fuel being delivered for burning in the kiln at the main burner.

16. In the process wherein materials are subjected to treatment with hot gas flowing upstream in a kiln, hot gas being produced upon burning of fuel in the kiln and in a stream of air primarily preheated outside the kiln, the materials within a predetermined region of the kiln being subject to materials temperature fluctuations characterized as ultimately adversely affecting said materials treatment, the steps that include secondarily preheating air in said stream prior to burning of said fuel therein, obtaining correction values corresponding to changes in the materials temperature within said predetermined region of the kiln, and using said correction values to control adjustment of said secondary preheating to compensate for said changes so as to counter said adverse effect upon the materials treatment, said correction values being determined substantially in accordance with the equation:

$$\Delta M_{NP} = K_2 \times \Delta T_{SM}$$

where $\Delta M_{NP}$=pound mols/second of fuel to be added or subtracted for $T_{SM}$ correction $K_2$=experimentally determined constant for any particular kiln process $\Delta T_{SM}$=difference between a predetermined desired temperature of the air stream, and the primarily preheated air stream temperature as sensed ($\Delta T_{AS} = T'_{AS} - T'_{AS}$ in ° R or ° F.).

17. In combination with apparatus including a kiln and wherein materials are formed into clinker by treatment with hot gas flowing upstream in the kiln, the materials undergoing calcination, fluidization and exothermic reaction while they move downstream through different zones in the kiln and means for passing an air stream and fuel into the kiln for combustion therein and for upstream hot gaseous flow in heat transfer relation with materials in the kiln, said air being primarily preheated outside the kiln, the improvement comprising means for secondarily preheating air in said stream prior to combustion with said fuel, and means for adjusting said secondary preheating to compensate for fluctuations in both the preheat temperature of the air stream and the temperature of materials undergoing exothermic reaction in the kiln thereby to achieve less variable heat treatment of the materials in the kiln.

18. In combination with apparatus including a kiln and wherein materials are formed into clinker by treatment with hot gas flowing upstream in the kiln, the materials undergoing calcination, fluidization and exothermic reaction while they move downstream through different zones in the kiln, and means for passing an air stream and fuel into the kiln for combustion therein and for upstream hot gaseous flow in heat transfer relation with materials in the kiln, said air being primarily preheated outside the kiln, the improvement comprising means for secondarily preheating air in said stream prior to combustion with said fuel, means for obtaining first correction values corresponding to changes in the preheat temperature of said stream, means for obtaining second correction values corresponding to changes in the temperature of materials undergoing exothermic reaction in the kiln, and means for utilizing said first and second correction values to control adjustment of said secondary preheating thereby to achieve less variable heat treatment of the materials in the kiln.

19. The invention as defined in claim 18 in which said means for obtaining said first correction values includes a temperature sensor for sensing the temperature of the air stream before said secondary preheating and apparatus to compare said sensed air stream temperature with a predetermined air stream temperature desired after said secondary preheating, and said means for obtaining said second correction values includes another temperature sensor for sensing the actual maximum temperature of the materials undergoing exothermic reaction in the kiln and apparatus to compare said actual maximum temperature of the materials with a predetermined desired materials maximum temperature.

20. The invention as defined in claim 18 in which said means for utilizing said first and second correction values has an output proportional to the sum of said values, and including an actuator responsive to said output for controlling said secondary preheating.

21. The invention as defined in claim 20 in which said means for secondarily preheating air includes pilot fuel burner means for heating the air stream outside the kiln, and including a valve controlled by said actuator for regulating fuel delivery to said pilot fuel burner means.

22. The invention as defined in claim 18 in which said means for obtaining said first correction values has an output which varies directly as the quantity $M'_{NP}$ in the equation:

$$M'_{NP} = K_1 \times \Delta T_{AS} \times M_{NB}$$

where $M'_{NP}$=pound mols/second of fuel to be used for $T'_{AS}$ correction $K_1$=experimentally determined constant for any particular kiln process $\Delta T_{AS}$=difference between a predetermined desired temperature of the air stream, and the primarily preheated air stream temperatures as sensed ($\Delta T_{AS} = T'_{AS} - T'_{AS}$ in ° R or ° F.)

$M_{NB}$=pound mols/second of fuel being delivered for burning in the kiln at the main burner.

23. The invention as defined in claim 18 in which said means for obtaining said second correction values has an output which varies directly as the quantity $\Delta M_{NP}$ in the equation:

$$\Delta M_{NP} = K_2 \times \Delta T_{SM}$$

where $\Delta M_{NP}$=pound mols/second of fuel to be added or subtracted for $T_{SM}$ correction $K_2$=experimentally determined constant for any particular kiln process $\Delta T_{SM}$=difference between a predetermined desired materials maximum temperature, and the maximum temperature of the materials within the kiln as sensed ($\Delta T_{SM} = T'_{SM} - T_{SM}$ in ° R or ° F.).

References Cited in the file of this patent

UNITED STATES PATENTS

| | | |
|---|---|---|
| 2,068,574 | Smith | Jan. 19, 1937 |
| 2,210,482 | Derrom | Aug. 6, 1940 |

UNITED STATES PATENT OFFICE
CERTIFICATE OF CORRECTION

Patent No. 3,091,443                                            May 28, 1963

Joseph H. Herz et al.

It is hereby certified that error appears in the above numbered patent requiring correction and that the said Letters Patent should read as corrected below.

Column 10, lines 13 and 14, for that portion of the formula reading

"$0.001946D^2 T_{SM}$" read -- $0.001946D^2 \Delta T_{SM}$ --.

Signed and sealed this 10th day of December 1963.

(SEAL)
Attest:

ERNEST W. SWIDER

Attesting Officer

EDWIN L. REYNOLDS

Acting Commissioner of Patents